US009633604B2

(12) United States Patent
Kimura et al.

(10) Patent No.: US 9,633,604 B2
(45) Date of Patent: Apr. 25, 2017

(54) DISPLAY DEVICE, METHOD FOR DRIVING DISPLAY DEVICE, AND ELECTRONIC APPARATUS

(71) Applicant: Sony Corporation, Tokyo (JP)

(72) Inventors: Kei Kimura, Kanagawa (JP); Yusuke Onoyama, Kanagawa (JP); Naobumi Toyomura, Kanagawa (JP); Junichi Yamashita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/350,896

(22) Filed: Nov. 14, 2016

(65) Prior Publication Data

US 2017/0061887 A1 Mar. 2, 2017

Related U.S. Application Data

(63) Continuation of application No. 14/326,992, filed on Jul. 9, 2014, now Pat. No. 9,524,673.

(30) Foreign Application Priority Data

Aug. 8, 2013 (JP) ................................. 2013-164875

(51) Int. Cl.

*G06F 3/038* (2013.01)
*G09G 3/3258* (2016.01)
*G09G 3/3266* (2016.01)

(52) U.S. Cl.

CPC ......... *G09G 3/3258* (2013.01); *G09G 3/3266* (2013.01); *G09G 2300/0809* (2013.01); *G09G 2320/045* (2013.01)

(58) Field of Classification Search

CPC ........... G09G 3/3233; G09G 2320/045; G09G 3/3266
USPC ..................................................... 345/79, 212
See application file for complete search history.

(56) References Cited

U.S. PATENT DOCUMENTS

2006/0077134 A1 4/2006 Hector
2012/0019498 A1 1/2012 Jeong
2012/0068992 A1* 3/2012 Toyomura ............ G09G 3/3233 345/212
2013/0113779 A1 5/2013 Yoon et al.
2013/0249888 A1* 9/2013 Sugimoto ............ G09G 3/3233 345/212
2013/0335399 A1* 12/2013 Tsuge ....................... G09G 3/30 345/212

FOREIGN PATENT DOCUMENTS

JP 2007-310311 A 11/2007

* cited by examiner

*Primary Examiner* — Jonathan Blancha
(74) *Attorney, Agent, or Firm* — Michael Best & Friedrich LLP

(57) ABSTRACT

Provided is a display device including a pixel array unit that is made by arranging a drive transistor to drive a light emitting unit, a sampling transistor to sample a signal voltage, and a pixel circuit having a storage capacitor to store the signal voltage which is written by sampling with the sampling transistor, and a drive unit that makes a gate node and a source node of the drive transistor be in a floating state up to performing writing of the signal voltage with the sampling transistor, after writing an initialization voltage in the gate node when the source node of the drive transistor is in a non-floating state.

20 Claims, 5 Drawing Sheets

DISPLAY DEVICE, METHOD FOR DRIVING DISPLAY DEVICE, AND ELECTRONIC APPARATUS

CROSS REFERENCE TO RELATED APPLICATIONS

This application is a Continuation Application of application Ser. No. 14/326,992, filed Jul. 9, 2014 and claims the benefit of Japanese Priority Patent Application JP 2013-164875 filed Aug. 8, 2013, the entire contents of which are incorporated herein by reference.

BACKGROUND

The present disclosure relates to a display device, a method for driving a display device, and an electronic apparatus.

In recent years, in a field of a display device, a flat surface type (flat panel type) display device that is made by arranging pixels including a light emitting unit, in a row and column shape (matrix shape), has become the mainstream. As one of the flat surface type display device, there is an organic EL display device using, for example, an organic electroluminescence (Electro Luminescence: EL) element, which is a so-called current drive type electro-optical element that changes light emitting luminance depending on a current value flowing through the light emitting unit.

In the flat surface type display device which is represented by the organic EL display device, there is a case that a transistor characteristic (for example, threshold voltage) of a drive transistor to drive the electro-optical element, varies for each pixel, by a fluctuation in a process, or the like. The variation in the transistor characteristic has an influence on the light emitting luminance. Specifically, even when a video signal of the same level (signal voltage) is written in each pixel, a display unevenness is generated since the light emitting luminance varies among the pixels, and thus, a uniform characteristic (uniformity) of a display screen is damaged. Therefore, a technology for correcting the display unevenness which is caused by the variations in the characteristics of the element to configure a pixel circuit, or the like, specifically, the technique for correcting the variation in the threshold voltage, is adopted (for example, see Japanese Unexamined Patent Application Publication No. 2007-310311).

SUMMARY

In the related art described above, an operation to correct the variation in the threshold voltage (hereinafter, there is the case of simply describing as "threshold correction operation") is performed in a state of initializing a gate voltage of the drive transistor that drives the electro-optical element, to a predetermined reference voltage (initialization voltage). Therefore, time for writing the initialization voltage in a gate node (gate electrode) of the drive transistor, is necessary to be set long. However, if the writing time of the initialization voltage is long, there is the case that a writing operation of the video signal which is performed thereafter is adversely affected.

It is desirable to provide a display device that can shorten writing time of an initialization voltage with respect to a gate node of a drive transistor at the time of performing correction operations of characteristics of the drive transistor, a method for driving the display device, and an electronic apparatus including the display device.

According to an embodiment of the present disclosure, there is provided a display device including a pixel array unit that is made by arranging a drive transistor to drive a light emitting unit, a sampling transistor to sample a signal voltage, and a pixel circuit having a storage capacitor to store the signal voltage which is written by sampling with the sampling transistor, and a drive unit that makes a gate node and a source node of the drive transistor be in a floating state up to performing writing of the signal voltage with the sampling transistor, after writing an initialization voltage in the gate node when the source node of the drive transistor is in a non-floating state.

According to another embodiment of the present disclosure, there is provided a method for driving a display device including a pixel array unit that is made by arranging a drive transistor to drive a light emitting unit, a sampling transistor to sample a signal voltage, and a pixel circuit having a storage capacitor to store the signal voltage which is written by sampling with the sampling transistor, the method including making a gate node and a source node of the drive transistor be in a floating state up to performing writing of the signal voltage with the sampling transistor, after writing an initialization voltage in the gate node when the source node of the drive transistor is in a non-floating state.

According to still another embodiment of the present disclosure, there is provided an electronic apparatus including a display device having a pixel array unit that is made by arranging a drive transistor to drive a light emitting unit, a sampling transistor to sample a signal voltage, and a pixel circuit having a storage capacitor to store the signal voltage which is written by sampling with the sampling transistor, and a drive unit that makes a gate node and a source node of the drive transistor be in a floating state up to performing writing of the signal voltage with the sampling transistor, after writing an initialization voltage in the gate node when the source node of the drive transistor is in a non-floating state.

In configurations described above, after writing of the initialization voltage in the gate node when the source node of the drive transistor is in the non-floating state, a self discharge operation is performed, by making the gate node and the source node of the drive transistor be in the floating state. Behavior of a potential of each node at the time of the self discharge operation, in the case of enhancing the drive transistor, and in the case of depressing the drive transistor, are different. Therefore, before the writing of the signal voltage is performed, a difference between reaching potentials of a source voltage and the gate voltage, is generated, depending on the characteristics of the drive transistor. After the self discharge operation, the writing of the signal voltage is performed while making the source node of the drive transistor be in the floating state, and thereby, the source voltage of the drive transistor is determined by a capacity coupling. As a result, in each pixel, in the state of correcting the variations in the characteristics of the drive transistor, a constant light emitting current is obtained, based on the voltage between the gate and the source of the drive transistor.

According to the embodiments of the present disclosure, by the correction operations of the characteristics of the drive transistor using the self discharge operation, it is possible to shorten the writing time of the initialization voltage for the correction operation with respect to the gate node of the drive transistor at the time of performing the correction operations.

DETAILED DESCRIPTION OF EMBODIMENTS

Figure 1:
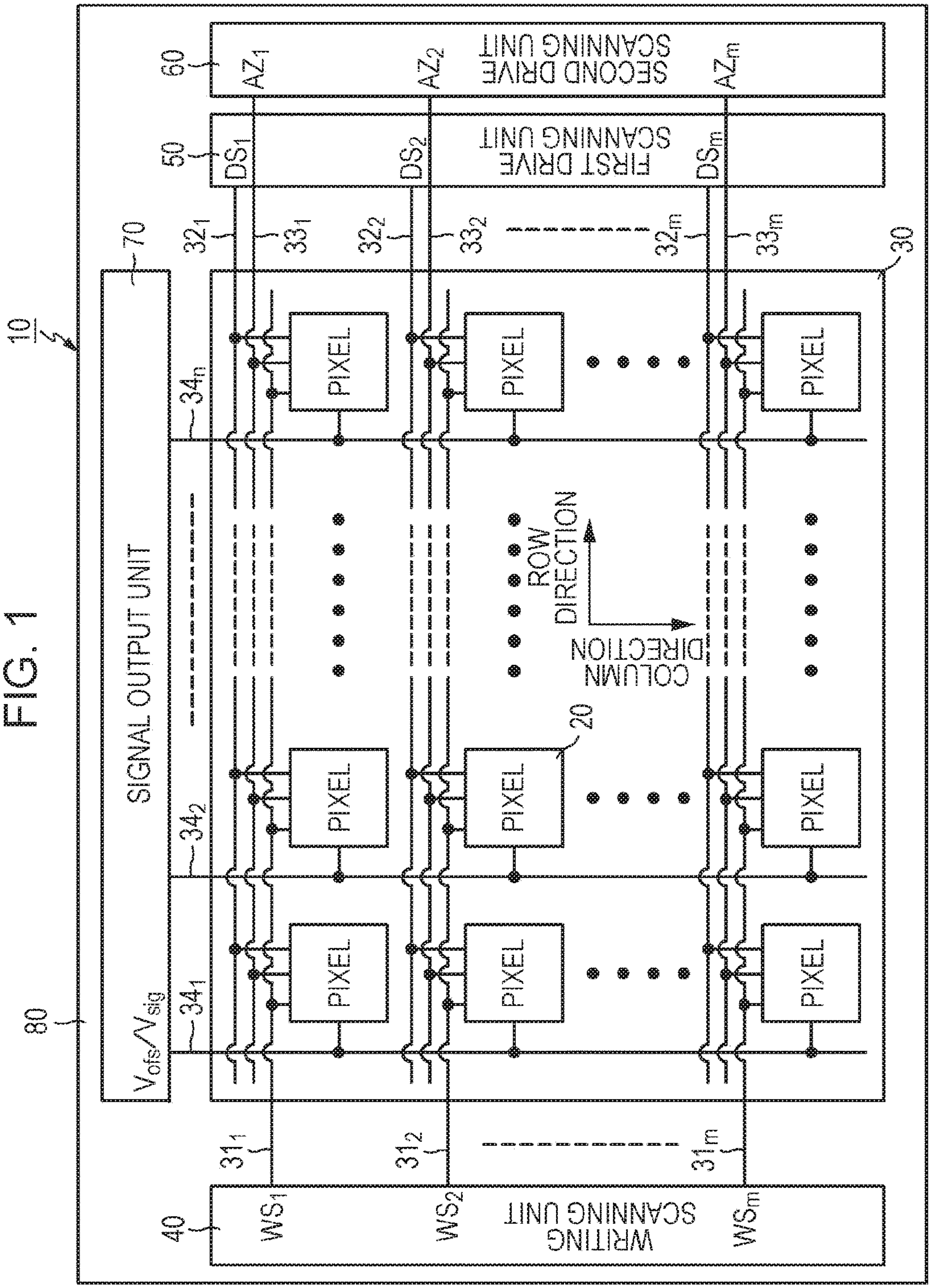
FIG. 1 is a system configuration diagram illustrating an outline of a configuration of an active matrix type display device according to an embodiment of the present disclosure.

Hereinafter, forms for carrying out techniques of the present disclosure (hereinafter, referred to as "embodiment") will be described in detail, using drawings. The present disclosure is not limited to the embodiments. In the following description, the same reference numerals are used to the same elements or the elements having the same functions, and the overlapping description is omitted. Furthermore, the description will be performed in the following order.

1. Description Generally Relating to a Display Device, a Method for Driving a Display Device, and an Electronic apparatus According to Embodiments of the Present Disclosure
2. Active Matrix Type Display Device According to an Embodiment
   2-1. System Configuration
   2-2. Pixel Circuit
   2-3. Driving Method According to a Comparative example
   2-4. Regarding Problems of the Comparative Example
   2-5. Driving Method According to an Embodiment
   2-6. Operation and Effect of the Embodiments
3. Modification Example
4. Electronic Apparatus Description Generally Relating to a Display Device, a Method for Driving a Display Device, and an Electronic apparatus According to Embodiments of the Present Disclosure A display device according to an embodiment of the present disclosure, is a flat surface type (flat panel type) display device that is made by arranging a drive transistor to drive a light emitting unit, a sampling transistor, and a pixel circuit having a storage capacitor. As the flat surface type display device, an organic EL display device, a liquid crystal display device, a plasma display device, or the like, may be used as an example. Among the display devices, the organic EL display device uses an organic EL element in which a phenomenon of applying an electric field to an organic thin film and emitting light is used using electroluminescence of an organic material, as a light emitting element (electro-optical element) of a pixel.

The organic EL display device using the organic EL element as a light emitting unit of the pixel, has strong points as follows. That is, since the organic EL element can be driven at an applied voltage of 10V or less, the organic EL display device has low power consumption. Since the organic EL element is a self light emitting type element, in the organic EL display device, visibility of an image is high, compared with the liquid crystal display device which is the flat surface type display device in the same manner. Moreover, since an illumination member such as a backlight is not necessary, it is easy to reduce in weight and thickness. Furthermore, since a response speed of the organic EL element is exceedingly fast as approximately several microseconds, in the organic EL display device, an afterimage does not occur at the time of displaying a moving image.

The organic EL element is a current drive type electro-optical element, along with being the self light emitting type element. As the current drive type electro-optical element, in addition to the organic EL element, an inorganic EL element, a LED element, a semiconductor laser element, or the like, may be used as an example.

In various electronic apparatuses including a display unit, the flat surface type display device such as the organic EL display device, may be used as a display unit (display device) thereof. As the various electronic apparatuses, in addition to a television system, a head mounted display, a digital camera, a video camera, a game machine, a notebook type personal computer, a portable information apparatus such as an electronic book apparatus, a portable communication apparatus such as a PDA (Personal Digital Assistant) and a cellular phone, or the like, may be used as an example.

In the display device, the method for driving a display device, and the electronic apparatus according to the embodiments of the present disclosure, a drive unit may make a source node be in a floating state after making a gate node of the drive transistor be in the floating state. Moreover, the drive unit may perform writing of a signal voltage with the sampling transistor while making the source node of the drive transistor be in the floating state. An initialization voltage may be supplied to a signal line at a timing different from the signal voltage, and may be written in the gate node of the drive transistor by sampling with the sampling transistor from the signal line.

In the display device, the method for driving a display device, and the electronic apparatus according to the embodiments of the present disclosure which include the preferable configurations described above, a pixel circuit may be formed on a semiconductor such as silicon. Furthermore, the drive transistor may be made up of a P-channel type transistor. As the drive transistor, the P-channel type transistor rather than an N-channel type transistor, is used due to the following reasons.

When the transistor is formed on the semiconductor such as the silicon rather than an insulator such as a glass substrate, the transistor does not have three terminals of a source/a gate/a drain, but has four terminals of the source/the gate/the drain/a back gate (base). Therefore, if the N-channel type transistor is used as a drive transistor, a back gate (substrate) voltage becomes 0V, and an operation which corrects a variation in a threshold voltage of the drive transistor for each pixel, is adversely affected.

Moreover, the variations in characteristics of the transistor are small, in the P-channel type transistor having no LDD area, compared with the N-channel type transistor having a LDD (Lightly Doped Drain) area. Therefore, there is an advantage to achieve refinement of the pixel and high definition of the display device. For the reason described above, when it is assumed that the transistor is formed on the semiconductor such as the silicon, it is preferable to use the P-channel type transistor rather than the N-channel type transistor, as a drive transistor.

In the display device, the method for driving a display device, and the electronic apparatus according to the embodiments of the present disclosure which include the preferable configurations described above, the sampling transistor may be made up of the P-channel type transistor.

Alternatively, in the display device, the method for driving a display device, and the electronic apparatus according to the embodiments of the present disclosure which include the preferable configurations described above, the pixel circuit may have a light emitting control transistor that controls light emitting/non-light emitting of the light emitting unit. At this time, the light emitting control transistor may also be made up of the P-channel type transistor.

Furthermore, in the display device, the method for driving a display device, and the electronic apparatus according to the embodiments of the present disclosure which include the preferable configurations described above, the storage capacitor may be connected between the gate node and the source node of the drive transistor. Moreover, the pixel circuit may have a sub-storage capacitor that is connected between the source node of the drive transistor and a node of a fixed potential.

Alternatively, in the display device, the method for driving a display device, and the electronic apparatus according to the embodiments of the present disclosure which include the preferable configurations described above, the pixel circuit may have a switching transistor that is connected between a drain node of the drive transistor and a current discharge destination node. At this time, the switching transistor may be made up of the P-channel type transistor. In addition, the drive unit may make the switching transistor be in a conduction state for a non-light emitting period of the light emitting unit.

Furthermore, in the display device, the method for driving a display device, and the electronic apparatus according to the embodiments of the present disclosure which include the preferable configurations described above, the drive unit makes a signal to drive the switching transistor be in an active state before a sampling timing of the initialization voltage with the sampling transistor. Therefore, the drive unit may make the signal to drive the switching transistor be in an inactive state after making the signal to drive the light emitting control transistor be in the active state. At this time, the drive unit may complete the sampling of the initialization voltage with the sampling transistor, before making the signal to drive the light emitting control transistor be in the inactive state.

Active Matrix Type Display Device According to an Embodiment

System Configuration

FIG. 1 is a system configuration diagram illustrating an outline of a configuration of an active matrix type display device according to an embodiment of the present disclosure. The active matrix type display device is the display device that controls a current flowing through the electro-optical element, by an active element which is arranged in the pixel circuit in the same manner as the electro-optical element, for example, an insulated gate type electric field effect transistor. As the insulated gate type electric field effect transistor, typically, a TFT (Thin Film Transistor) may be used as an example.

Here, as an example, a case that an active matrix type organic EL display device uses, for example, an organic EL element, which is a current drive type electro-optical element changing light emitting luminance depending on a current value flowing through the device, as the light emitting unit (light emitting element) of the pixel circuit, will be described. Hereinafter, there is the case that the "pixel circuit" is simply described as the "pixel".

As shown in FIG. 1, an organic EL display device 10 according to the embodiment of the present disclosure, includes a pixel array unit 30 that is made by two-dimensionally arranging a plurality of pixels 20 including the organic EL element in a row and column shape, and a drive circuit unit (drive unit) that is arranged on the periphery of the pixel array unit 30. For example, the drive circuit unit is made up of a writing scanning unit 40 which is arranged on a display panel 80 in the same manner as the pixel array unit 30, a first drive scanning unit 50, a second drive scanning unit 60, and a signal output unit 70, and drives the pixels 20 of the pixel array unit 30, respectively. Furthermore, it is possible to adopt the configuration of arranging several or all of the writing scanning unit 40, the first drive scanning unit 50, the second drive scanning unit 60, and the signal output unit 70, outside of the display panel 80.

Here, if the organic EL display device 10 corresponds to a color display, one pixel (unit pixel/pixel) which is a unit to form a color image, is configured of a plurality of sub pixels (subpixels). At this time, each of the sub pixels correspond to the pixels 20 of FIG. 1. More specifically, in the display device corresponding to the color display, for example, one pixel is configured of three sub pixels of the sub pixel emitting a red color (Red; R) light, the sub pixel emitting a green color (Green; G) light, and the sub pixel emitting a blue color (Blue; B) light.

However, as one pixel, it is not limited to a combination of the sub pixels of three primary colors of RGB. Furthermore, one pixel can be configured by adding the sub pixel of one color or the sub pixels of the plurality of colors, to the sub pixels of three primary colors. More specifically, for example, one pixel can be configured by adding the sub pixel emitting a white color (White; W) light for improving the luminance, or one pixel can be configured by adding at least one sub pixel emitting a complementary color light for enlarging a color reproduction range.

In the pixel array unit 30, with respect to an arrangement of the pixels 20 in m rows and n columns, a scanning line 31 ($31_1$ to $31_m$), a first drive line 32 ($32_1$ to $32_m$), and a second drive line 33 ($33_1$ to $33_m$) are wired for each pixel row along a row direction (arrangement direction of the pixel in a pixel row/horizontal direction).

Furthermore, with respect to the arrangement of the pixels 20 in m rows and n columns, a signal line 34 ($34_1$ to $34_n$) is wired for each pixel column along a column direction (arrangement direction of the pixel in a pixel column/vertical direction).

The scanning lines $31_1$ to $31_m$ are connected to an output terminal of the row corresponding to the writing scanning unit 40, respectively. The first drive lines $32_1$ to $32_m$ are connected to the output terminal of the row corresponding to the first drive scanning unit 50, respectively. The second drive lines $33_1$ to $33_m$ are connected to the output terminal of the row corresponding to the second drive scanning unit 60, respectively. The signal lines $34_1$ to $34_n$ are connected to the output terminal of the row corresponding to the signal output unit 70, respectively.

The writing scanning unit 40 is configured by a shift register circuit, or the like. When the signal voltage of a video signal is written to each of the pixels 20 of the pixel array unit 30, the writing scanning unit 40 scans each of the pixels 20 of the pixel array unit 30 by a row unit in order, by sequentially supplying a writing scanning signal WS ($WS_1$ to $WS_m$) with respect to the scanning line 31 ($\mathbf{31}_1$ to $\mathbf{31}_m$). The writing scanning unit 40 performs so-called line sequential scanning.

In the same manner as the writing scanning unit 40, the first drive scanning unit 50 is configured by the shift register circuit, or the like. The first drive scanning unit 50 synchronizes the line sequential scanning with the writing scanning unit 40, and performs control of light emitting/non-light emitting (quenching) of the pixels 20, by supplying a light emitting control signal DS ($DS_1$ to $DS_m$) with respect to the first drive line 32 ($\mathbf{32}_1$ to $\mathbf{32}_m$).

In the same manner as the writing scanning unit 40, the second drive scanning unit 60 is configured by the shift register circuit, or the like. The second drive scanning unit 60 synchronizes the line sequential scanning with the writing scanning unit 40, and performs the control to make no light emitting of the pixels 20 for the non-light emitting period, by supplying a drive signal AZ ($AZ_1$ to $AZ_m$) with respect to the second drive line 33 ($\mathbf{33}_1$ to $\mathbf{33}_m$).

The signal output unit 70 selectively outputs the signal voltage of the video signal (hereinafter, there is the case of simply describing as "signal voltage") $V_{sig}$ and a reference voltage $V_{ofs}$, according to luminance information which is supplied from a signal supply source (not shown). Here, the reference voltage $V_{ofs}$ is the voltage which is equivalent to the voltage which is a reference of the signal voltage $V_{sig}$ of the video signal (for example, the voltage corresponding to a black level of the video signal), or is the voltage in the vicinity thereof. In addition, the reference voltage $V_{ofs}$ is the initialization voltage which is used at the time of performing correction operations described below.

One between the signal voltage $V_{sig}$/the reference voltage $V_{ofs}$, is output from the signal output unit 70, and is written by the unit of the pixel row which is selected by the line sequential scanning with the writing scanning unit 40, through the signal line 34 ($\mathbf{34}_1$ to $\mathbf{34}_n$) with respect to each of the pixels 20 of the pixel array unit 30. That is, the signal output unit 70 adopts the drive form of line sequential writing that writes the signal voltage $V_{sig}$ by the pixel row (line) unit.

Pixel Circuit

Figure 2:
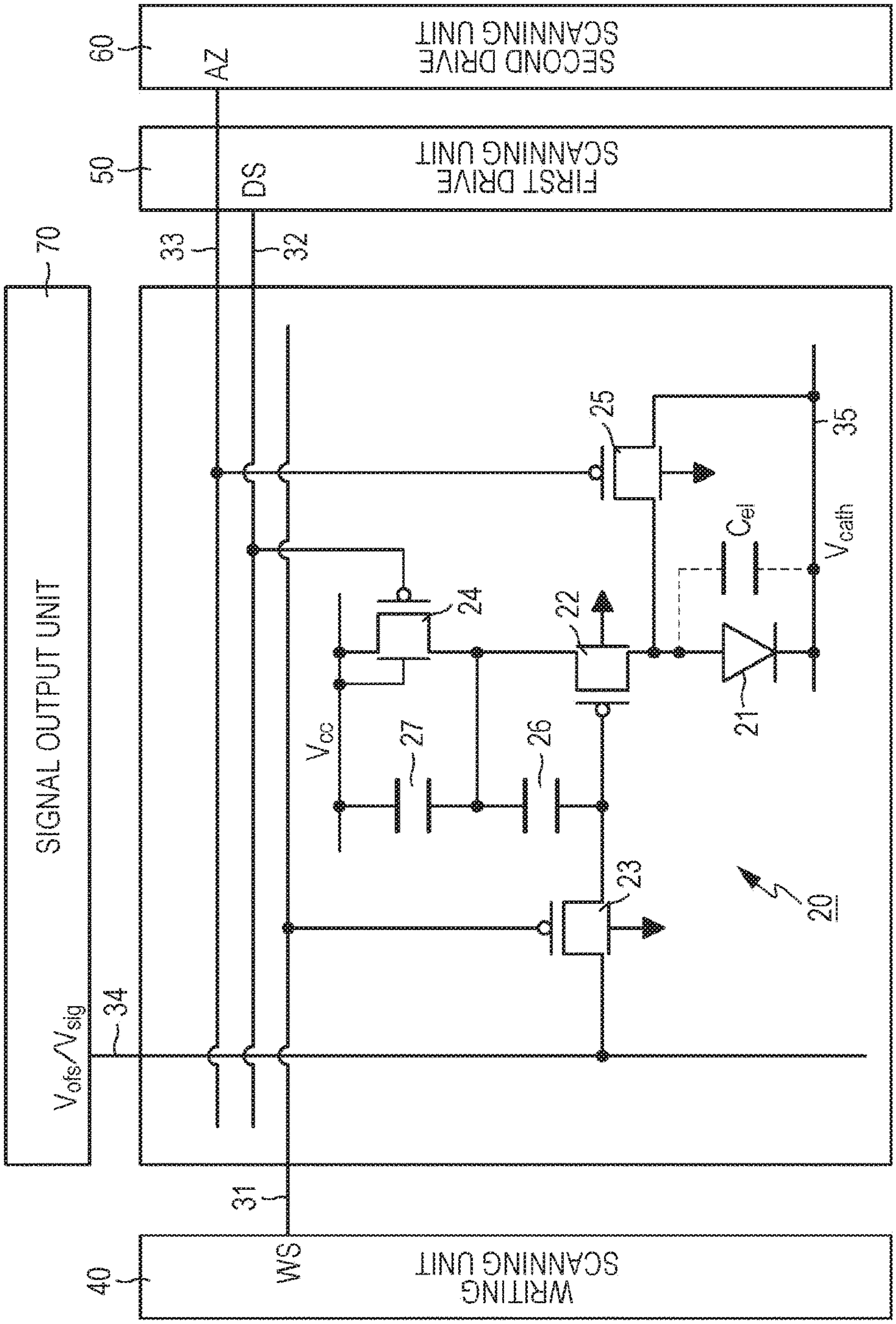
FIG. 2 is a circuit diagram illustrating a circuit example of a pixel (pixel circuit) in the active matrix type display device according to the embodiment of the present disclosure.

FIG. 2 is a circuit diagram illustrating a circuit example of the pixel (pixel circuit) in the active matrix type display device according to the embodiment of the present disclosure. The light emitting unit of the pixel 20 is made up of an organic EL element 21. The organic EL element 21 is an example of the current drive type electro-optical element that changes the light emitting luminance depending on the current value flowing through the device.

As shown in FIG. 2, the pixel 20 is configured by the organic EL element 21, and the drive circuit that drives the organic EL element 21 by making the current flow through the organic EL element 21. In the organic EL element 21, a cathode electrode is connected to a common power supply line 35 which is wired in common with respect to all the pixels 20.

The drive circuit to drive the organic El element 21, includes a drive transistor 22, a sampling transistor 23, a light emitting control transistor 24, a switching transistor 25, a storage capacitor 26, and a sub-storage capacitor 27. Moreover, in the embodiments according to the present disclosure, the pixel (pixel circuit) 20 is formed on the semiconductor such as the silicon rather than the insulator such as the glass substrate. Therefore, the drive transistor 22 is made up of the P-channel type transistor.

Furthermore, in the embodiments according to the present disclosure, in the same manner as the drive transistor 22, the sampling transistor 23, the light emitting control transistor 24, and the switching transistor 25 adopt the configuration using the P-channel type transistor. Accordingly, the drive transistor 22, the sampling transistor 23, the light emitting control transistor 24, and the switching transistor 25 do not have three terminals of the source/the gate/the drain, but have four terminals of the source/the gate/the drain/the back gate. A power supply voltage $V_{cc}$ is applied to the back gate of each transistor.

In the pixel 20 having the configuration described above, the sampling transistor 23 writes the signal voltage $V_{sig}$ which is supplied through the signal line 34 from the signal output unit 70, in the gate node (gate electrode) of the drive transistor 22 by the sampling. The light emitting control transistor 24 is connected between a power supply node of the power supply voltage $V_{cc}$ and the source node (source electrode) of the drive transistor 22, and controls the light emitting/non-light emitting of the organic EL element 21, under the drive with the light emitting control signal DS. The switching transistor 25 is connected between the drain node (drain electrode) of the drive transistor 22 and the current discharge destination node (for example, the common power supply line 35), and controls so that the organic EL element 21 does not emit the light for the non-light emitting period of the organic EL element 21, under the drive with the drive signal AZ.

The storage capacitor 26 is connected between the gate node and the source node of the drive transistor 22, and stores the signal voltage $V_{sig}$ which is written by the sampling with the sampling transistor 23. The drive transistor 22 drives the organic EL element 21, by making a drive current flow through the organic EL element 21 according to a storage voltage of the storage capacitor 26. The sub-storage capacitor 27 is connected between the source node of the drive transistor 22 and the node of the fixed potential (for example, the power supply node of the power supply voltage $V_{cc}$). The sub-storage capacitor 27 is operable to suppress a fluctuation in the source voltage of the drive transistor 22 at the time of writing the signal voltage $V_{sig}$, and to make a voltage $V_{gs}$ between the gate and the source of the drive transistor 22 into a threshold voltage $V_{th}$ of the drive transistor 22.

Driving Method According to a Comparative Example

Here, relating to a method for driving the active matrix type organic EL display device 10 including the configuration described above, first, the related art as a driving method according to a comparative example, will be described using a timing waveform diagram of FIG. 3, rather than the technique of the present disclosure (that is, a driving method according to an embodiment).

Figure 3:
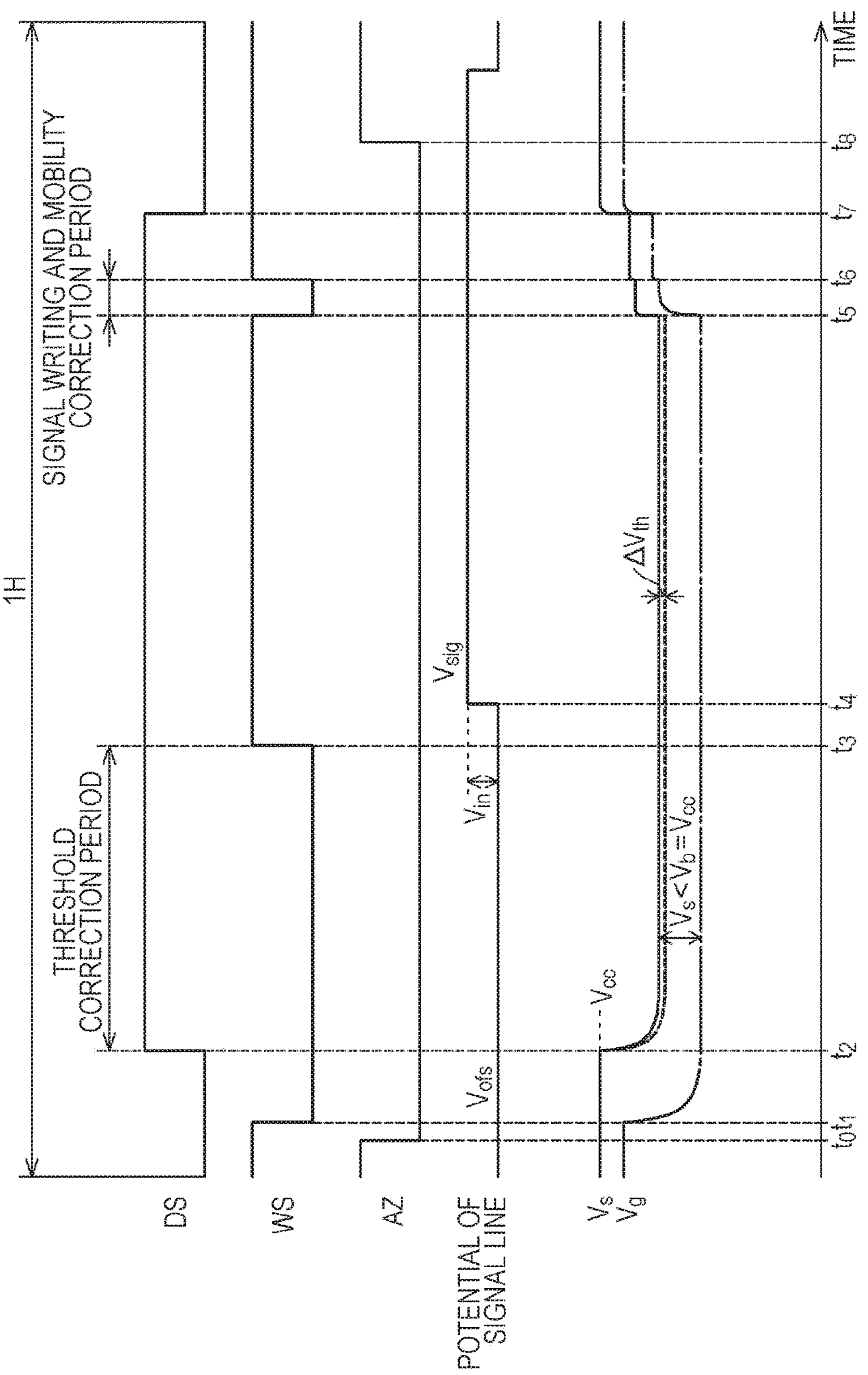
FIG. 3 is a timing waveform diagram for describing a driving method according to a comparative example.

In the timing waveform diagram of FIG. 3, situations of changes in the light emitting control signal DS, the writing scanning signal WS, the drive signal AZ, a potential $V_{ofs}$/$V_{sig}$ of the signal line 34, and the source voltage $V_s$ and the gate voltage $V_g$ of the drive transistor 22, are shown, respectively.

Since the sampling transistor 23, the light emitting control transistor 24, and the switching transistor 25 are the P-channel type transistors, a low voltage state of the writing scanning signal WS, the light emitting control signal DS, and the drive signal AZ becomes the active state, and a high voltage state thereof becomes the inactive state. Therefore, the sampling transistor 23, the light emitting control transistor 24, and the switching transistor 25, are made to be in the conduction state by the active state of the writing scanning signal WS, the light emitting control signal DS, and the drive signal AZ, and are made to be in a non-conduction state by the inactive state thereof.

At time $t_1$, the writing scanning signal WS transfers from a high voltage to a low voltage, and thereby the sampling transistor 23 is in the conduction state. At this time, the reference voltage $V_{ofs}$ is output, with respect to the signal line 34 from the signal output unit 70. Accordingly, since the reference voltage $V_{ofs}$ is written in the gate node of the drive transistor 22 by the sampling with the sampling transistor 23, the gate voltage $V_g$ of the drive transistor 22 becomes the reference voltage $V_{ofs}$.

Moreover, at time $t_1$, the light emitting control signal DS is in the low voltage state, and the light emitting control transistor 24 is in the conduction state. Accordingly, the source voltage $V_s$ of the drive transistor 22 becomes the power supply voltage $V_{cc}$. At this time, the voltage $V_{gs}$ between the gate and the source of the drive transistor 22, becomes $V_{gs}=V_{ofs}-V_{cc}$.

Here, in order to perform a threshold correction operation (threshold correction processing), it is necessary that the voltage $V_{gs}$ between the gate and the source of the drive transistor 22 is larger than the threshold voltage $V_{th}$ of the drive transistor 22. Therefore, each voltage value is set so as to be $|V_{gs}|=|V_{ofs}-V_{cc}|>|V_{th}|$.

As described above, an initialization operation that the gate voltage $V_g$ of the drive transistor 22 is set as the reference voltage $V_{ofs}$, and the source voltage $V_s$ of the drive transistor 22 is set as the power supply voltage $V_{cc}$, is a preparation (threshold correction preparation) operation before performing the following threshold correction operation. Accordingly, the reference voltage $V_{ofs}$ and the power supply voltage $V_{cc}$ are referred to as the initialization voltages of the gate voltage $V_g$ and the source voltage $V_s$ of the drive transistor 22, respectively.

Next, at time $t_2$, if the light emitting control signal DS transfers from the low voltage to the high voltage and the light emitting control transistor 24 is in the non-conduction state, the source node of the drive transistor 22 is in the floating state, and the threshold correction operation is started in the state of maintaining the gate voltage $V_g$ of the drive transistor 22 at the reference voltage $V_{ofs}$. That is, the source voltage $V_s$ of the drive transistor 22 starts a lowering (decrease) thereof, toward the voltage $(V_g-V_{th})$ which is obtained by subtracting the threshold voltage $V_{th}$ from the gate voltage $V_g$ of the drive transistor 22.

In the driving method according to the comparative example, on the basis of the initialization voltage $V_{ofs}$ of the gate voltage $V_g$ of the drive transistor 22, the operation that changes the source voltage $V_s$ of the drive transistor 22 toward the voltage $(V_g-V_{th})$ which is obtained by subtracting the threshold voltage $V_{th}$ of the drive transistor 22 from the initialization voltage $V_{ofs}$, becomes the threshold correction operation. If the threshold correction operation proceeds, the voltage $V_{gs}$ between the gate and the source of the drive transistor 22 finally converges on the threshold voltage $V_{th}$ of the drive transistor 22. The voltage corresponding to the threshold voltage $V_{th}$ is stored in the storage capacitor 26.

At time $t_3$, if the writing scanning signal WS transfers from the low voltage to the high voltage and the sampling transistor 23 is in the non-conduction state, a threshold correction period is finished. Thereafter, at time $t_4$, the signal voltage $V_{sig}$ of the video signal is output to the signal line 34 from the signal output unit 70, and the potential of the signal line 34 is switched to the signal voltage $V_{sig}$ from the reference voltage $V_{ofs}$.

Next, at time $t_5$, by transferring the writing scanning signal WS from the high voltage to the low voltage, the sampling transistor 23 is in the conduction state, and the signal voltage $V_{sig}$ is sampled and is written in the pixel 20. By the writing operation of the signal voltage $V_{sig}$ with the sampling transistor 23, the gate voltage $V_g$ of the drive transistor 22 becomes the signal voltage $V_{sig}$.

When the signal voltage $V_{sig}$ of the video signal is written, the sub-storage capacitor 27 that is connected between the source node of the drive transistor 22 and the power supply node of the power supply voltage $V_{cc}$, is operable to suppress the fluctuation in the source voltage $V_s$ of the drive transistor 22. Therefore, at the time of driving the drive transistor 22 with the signal voltage $V_{sig}$ of the video signal, the threshold voltage $V_{th}$ of the drive transistor 22 is offset by the voltage corresponding to the threshold voltage $V_{th}$ which is stored in the storage capacitor 26.

At this time, the voltage $V_{gs}$ between the gate and the source of the drive transistor 22 opens (becomes larger) depending on the signal voltage $V_{sig}$, but the source voltage $V_s$ of the drive transistor 22 is still in the floating state. Therefore, an electric charge which is charged in the storage capacitor 26, is discharged depending on the characteristics of the drive transistor 22. At this time, charge of an equivalent capacitor $C_{el}$ in the organic EL element 21 is started by the current flowing through the drive transistor 22.

The equivalent capacitor $C_{el}$ of the organic EL element 21 is charged, and thereby the source voltage $V_s$ of the drive transistor 22 is gradually lowered with the lapse of time. At this time, when the variation in the threshold voltage $V_{th}$ of the drive transistor 22 for each pixel is already canceled, a current $I_{ds}$ between the drain and the source of the drive transistor 22 depends on a mobility u of the drive transistor 22. Furthermore, the mobility u of the drive transistor 22 is the mobility of a semiconductor thin film to configure the channel of the drive transistor 22.

Here, a lowering amount in the source voltage $V_s$ of the drive transistor 22 is operable to discharge the electric charge which is charged in the storage capacitor 26. In other words, the lowering amount (change amount) in the source voltage $V_s$ of the drive transistor 22, makes negative feedback be applied with respect to the storage capacitor 26. Accordingly, the lowering amount in the source voltage $V_s$ of the drive transistor 22 becomes a feedback amount of the negative feedback.

As described above, the negative feedback is applied with respect to the storage capacitor 26 by the feedback amount according to the current $I_{ds}$ between the drain and the source flowing through the drive transistor 22, and thereby it is possible to negate dependence resisting the mobility u of the current $I_{ds}$ between the drain and the source of the drive transistor 22. The negation operation (negation processing) is a mobility correction operation (mobility correction processing) that corrects the variation in the mobility u of the drive transistor 22 for each pixel.

More specifically, since a signal amplitude $V_{in}$ $(V_{sig}-V_{ofs})$ of the video signal which is written in the gate electrode of the drive transistor 22 is so large that the current $I_{ds}$ between the drain and the source becomes large, an absolute value of the feedback amount of the negative feedback also becomes large. Therefore, the mobility correction operation is performed, according to the signal amplitude $V_{in}$ of the video signal, that is, a light emitting luminance level. Moreover, when the signal amplitude $V_{in}$ of the video signal is constant, the mobility u of the drive transistor 22 is so large that the absolute value of the feedback amount of the negative feedback becomes large, and thus, it is possible to remove the variation in the mobility u for each pixel.

At time $t_6$, the writing scanning signal WS transfers from the low voltage to the high voltage, and the sampling transistor 23 is in the non-conduction state, and thereby a signal writing and mobility correction period is finished. After performing the mobility correction, at time t7, the light emitting control signal DS transfers from the high voltage to the low voltage, and thereby the light emitting control transistor 24 is in the conduction state. Hereby, the current is supplied to the drive transistor 22, through the light emitting control transistor 24 from the power supply node of the power supply voltage $V_{cc}$.

At this time, the sampling transistor 23 is in the non-conduction state, and thereby the gate node of the drive transistor 22 is in the floating state of being electrically disconnected from the signal line 34. Here, when the gate node of the drive transistor 22 is in the floating state, the storage capacitor 26 is connected between the gate and the source of the drive transistor 22, and thereby the gate voltage $V_{gs}$ also fluctuates in conjunction with the fluctuation in the source voltage $V_s$ of the drive transistor 22.

That is, the source voltage $V_s$ and the gate voltage $V_g$ of the drive transistor 22 increase, while storing the voltage $V_{gs}$ between the gate and the source which is stored in the storage capacitor 26. Therefore, the source voltage $V_s$ of the drive transistor 22 increases up to a light emitting voltage $V_{oled}$ of the organic EL element 21, according to a saturation current of the transistor.

As described above, the operation that the gate voltage $V_g$ of the drive transistor 22 fluctuates in conjunction with the fluctuation in the source voltage $V_s$, is a bootstrap operation. In other words, the bootstrap operation is the operation that the gate voltage $V_g$ and the source voltage $V_s$ of the drive transistor 22 fluctuate, while storing the voltage $V_{gs}$ between the gate and the source which is stored in the storage capacitor 26, that is, the voltage between both terminals of the storage capacitor 26.

The current $I_{ds}$ between the drain and the source of the drive transistor 22 begins to flow through the organic EL element 21, and thereby an anode voltage $V_{ano}$ of the organic EL element 21 depending on the current $I_{ds}$, increases. Finally, if the anode voltage $V_{ano}$ of the organic EL element 21 exceeds a threshold voltage $V_{thel}$ of the organic EL element 21, the drive current begins to flow through the organic EL element 21, and thus, the organic EL element 21 starts the light emitting thereof.

On the other hand, the second drive scanning unit 60 makes the drive signal AZ be in the active state (low potential state), for the period which is from time $t_0$ before time $t_1$, up to time $t_8$ after time $t_7$. The period of time $t_0$ to time $t_8$ is the non-light emitting period of the organic EL element 21. The drive signal AZ is in the active state for the non-light emitting period, and thereby the switching transistor 25 is in the conduction state in response thereto.

By making the switching transistor 25 be in the conduction state, through the switching transistor 25, a short circuit between the drain node of the drive transistor 22 (anode electrode of the organic EL element 21) and the common power supply line 35 which is the current discharge destination node, is electrically generated. Here, an on-resistance of the switching transistor 25 is greatly small, compared to that of the organic EL element 21. Accordingly, for the non-light emitting period of the organic EL element 21, the current flowing through the drive transistor 22 can forcibly flow down into the common power supply line 35, so as not to flow into the organic EL element 21. Incidentally, the drive signal AZ is in the active state for 1H in which the threshold correction and the signal writing are performed, but the drive signal AZ is the inactive state in the following light emitting period.

Here, in the configuration of the pixel having no switching transistor 25, the present inventors pay attention to operation points, from a threshold correction preparation period to the threshold correction period (time $t_1$ to time $t_3$). As apparent from the operation description described above, if the threshold correction operation is performed, the voltage $V_{gs}$ between the gate and the source of the drive transistor 22 is necessary to be larger than the threshold voltage $V_{th}$ of the drive transistor 22.

If the voltage $V_{gs}$ between the gate and the source is larger than the threshold voltage $V_{th}$, the current flows through the drive transistor 22. Then, from the threshold correction preparation period to a part of the threshold correction period, the anode voltage $V_{ano}$ of the organic EL element 21 temporarily exceeds the threshold voltage $V_{thel}$ of the organic EL element 21. Hereby, since the current flows into the organic EL element 21 from the drive transistor 22, in spite of the non-light emitting period, without depending on a gradation of the signal voltage $V_{sig}$, the organic EL element 21 emits the light at the constant luminance for each frame. As a result, the decrease in contrast of the display panel 80 is caused.

In contrast, in the configuration of the pixel having the switching transistor 25, by the operations of the switching transistor 25 described above, for the non-light emitting period of the organic EL element 21, it is possible to prevent the current flowing through the drive transistor 22 from flowing into the organic EL element 21. Hereby, for the non-light emitting period, it is possible to suppress the light emitting of the organic EL element 21. Consequently, it is possible to achieve the high contrast of the display panel 80, compared with the configuration of the pixel having no switching transistor 25.

In a series of the circuit operations described above, each of the threshold correction preparation operation, the threshold correction operation, the writing operation of the signal voltage $V_{sig}$ (signal writing), and the mobility correction operation, is performed, for example, for a one horizontal period (1H).

Regarding Problems of the Comparative Example

In the driving method according to the comparative example described above, the threshold correction operation is performed, in the state of making the gate voltage $V_g$ of the drive transistor 22 to drive the organic EL element 21 into the initialization voltage. In other words, until the threshold correction operation is completed, the gate voltage $V_g$ of the drive transistor 22 is necessary to be the reference voltage $V_{ofs}$ which is the initialization voltage. Therefore, the time ($t_1$ to $t_3$) for writing the reference voltage $V_{ofs}$ in the gate node of the drive transistor 22, is necessary to be set long.

However, if the writing time of the reference voltage $V_{ofs}$ is long, there is the case that the writing operation of the signal voltage $V_{sig}$ of the video signal which is performed thereafter is adversely affected. More specifically, when the video signal is written, the sufficient time for a start-up of the video signal is not secured, and thus, the writing operation is completed before the video signal reaches the desired level. That is, since the signal level of the video signal is written before reaching the desired level, and thus the luminance corresponding to the desired level is not obtained.

Furthermore, when the pixel (pixel circuit) 20 is formed on the semiconductor such as the silicon, there is a substrate bias effect that the threshold voltage $V_{th}$ of the transistor is fluctuated by the voltage of the back gate, and there is a possibility that defects caused by the substrate bias effect are generated. The defects which is caused by the substrate bias effect, will be described below in detail.

In the threshold correction operation, the gate node of the drive transistor 22 is fixed to the reference voltage $V_{ofs}$, and the discharge operation is performed in the floating state of the source node. Thereby, the difference between the source voltage $V_s$ and the back gate voltage $V_b$ of the drive transistor 22, is generated. Specifically, the source voltage $V_s$ of the drive transistor 22 is smaller than the back gate voltage $V_b$ (=$V_{cc}$). At this point of time, the voltage $V_{gs}$ between the gate and the source of the drive transistor 22 is enhanced only by $\Delta V_{th}$, due to the substrate bias effect ($V_{gs}=V_{th}+\Delta V_{th}$).

On the other hand, at the light emitting time, since the source voltage $V_s$ of the drive transistor 22 becomes equal to the back gate voltage $V_b$ ($V_s=V_b$), the voltage $V_{gs}$ between the gate and the source of the drive transistor 22, is the original threshold voltage $V_{th}$ which is not enhanced with the substrate bias effect ($V_{gs}=V_{th}$). Accordingly, since the threshold correction operation is made at the operation point which is different from the light emitting time to be $V_s=V_b$, the variation in the threshold voltage $V_{th}$ occurs as a luminance difference at the actual light emitting time. That is, at the time of forming the pixel 20 on the semiconductor (semiconductor substrate), if the threshold correction operation is performed under the driving with the driving method according to the comparative example, the variation in the threshold voltage $V_{th}$ may not be sufficiently corrected by the difference between the actual effect $V_{th}$ which is obtained at the correction time and the actual effect $V_{th}$ which is obtained at the light emitting time, and thereby uniformity is deteriorated.

Driving Method According to an Embodiment

Compared with the driving method according to the comparative example described above, in the driving method according to the embodiment of the present disclosure, there are features of performing the driving as follows. First, the reference voltage $V_{ofs}$ which is the initialization voltage is written in the gate node when the source node of the drive transistor 22 is in non-floating state. Thereafter, the gate node and the source node of the drive transistor 22 are made to be in the floating state, up to performing the writing of the signal voltage $V_{sig}$ with the sampling transistor 23.

Hereinafter, the driving method according to the embodiment of the present disclosure, will be more specifically described using the timing waveform diagram of FIG. 4. In the timing waveform diagram of FIG. 4, the situations of the changes in the light emitting control signal DS, the writing scanning signal WS, the drive signal AZ, the potential $V_{ofs}/V_{sig}$ of the signal line 34, and the source voltage $V_s$ and the gate voltage $V_g$ of the drive transistor 22, are shown, respectively.

Figure 4:
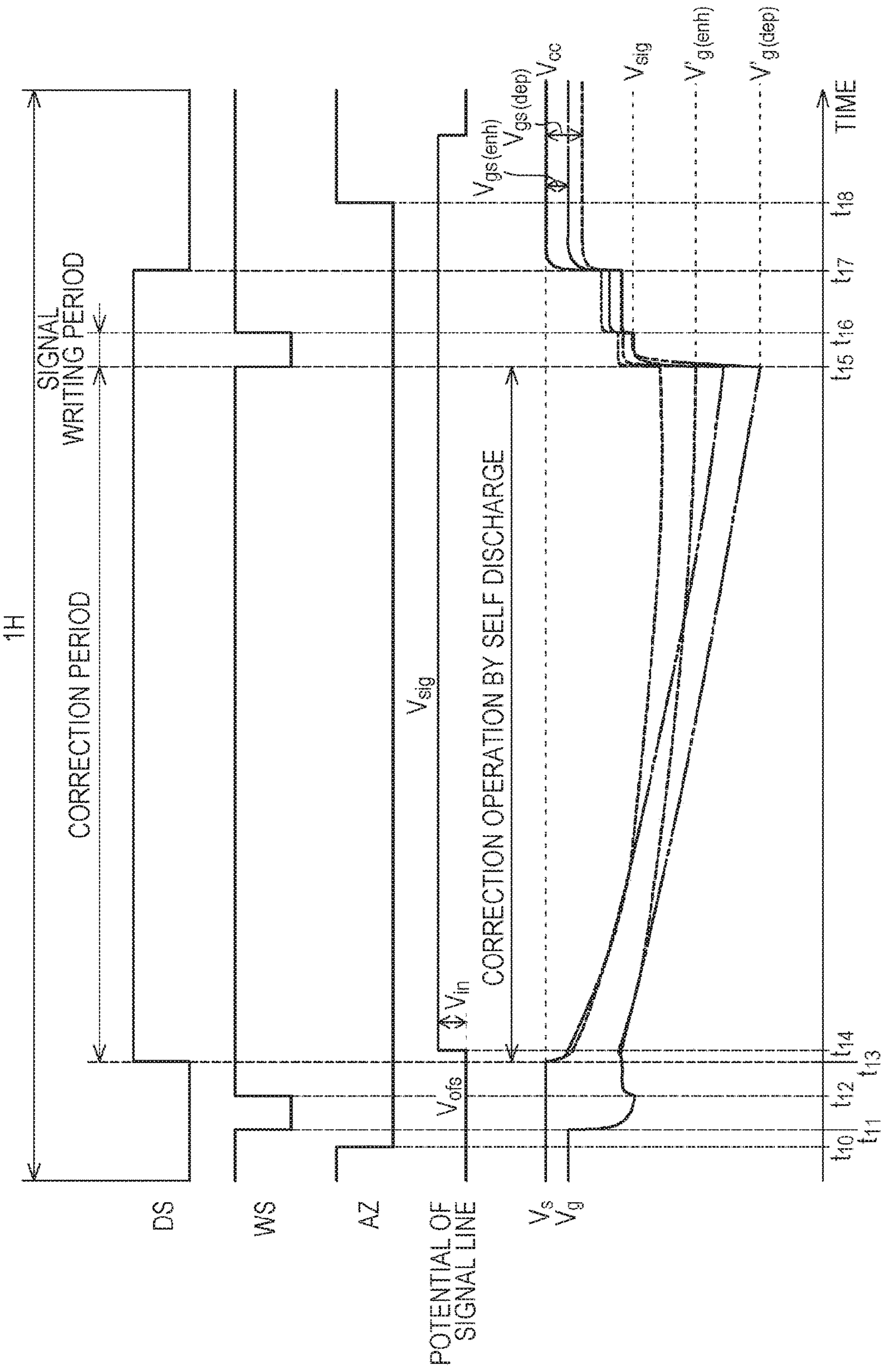
FIG. 4 is a timing waveform diagram for describing a driving method according to an embodiment of the present disclosure.

In FIG. 4, if the threshold voltage $V_{th}$ is relatively large, the source voltage $V_s$ and the gate voltage $V_g$ of the drive transistor 22 which is enhanced, are shown in broken lines. Furthermore, if the threshold voltage $V_{th}$ is relatively small, the source voltage $V_s$ and the gate voltage $V_g$ of the drive transistor 22 which is depressed, are shown in two-dot chain lines.

At time $t_{10}$ that the light emitting control signal DS is in the active state (low voltage state), and the writing scanning signal WS is in the inactive state (high voltage state), the drive signal AZ is in the active state. That is, the drive signal AZ is in the active state before the sampling timing (time $t_{11}$) of the initialization voltage (namely, the reference voltage $V_{ofs}$) with the sampling transistor 23. Therefore, the driving signal AZ is in the active state, and thereby the switching transistor 25 is in the conduction state. Hence, thereafter, the current flowing through the drive transistor 22 flows into the common power supply line 35 which is the current discharge destination node, through the switching transistor 25.

Next, at time $t_{11}$, the writing scanning signal WS is in the active state, and the sampling transistor 23 is in the conduction state in response thereto. At this time, the light emitting control transistor 24 is in the conduction state, and thereby the power supply voltage $V_{cc}$ is applied to the source node of the drive transistor 22. That is, the source node of the drive transistor 22 is in the non-floating state. In the state, by the sampling with the sampling transistor 23, the reference voltage $V_{ofs}$ is written in the gate node of the drive transistor 22. As described above, the reference voltage $V_{ofs}$ is supplied to the signal line 34 from the signal output unit 70, at the timing different from the signal voltage $V_{sig}$.

Therefore, at time $t_{12}$, the writing scanning signal WS is in the inactive state, and thereby the writing of the reference voltage $V_{ofs}$ is finished. That is, before the timing (time $t_{13}$) at which the light emitting control signal DS is in the active state, the writing (sampling) of the reference voltage $V_{ofs}$ with the sampling transistor 23 is completed. Furthermore, the current flows through the drive transistor 22 by writing the reference voltage $V_{ofs}$. However, as described above, the switching transistor 25 is in the conduction state, and thereby the current flowing through the drive transistor 22 flows into the common power supply line 35 which is the current discharge destination node, through the switching transistor 25. Accordingly, since the organic EL element 21 does not emit the light, the contrast of the display panel 80 does not decrease.

Moreover, at time $t_{12}$, the writing scanning signal WS is in the inactive state, and the sampling transistor 23 is in the non-conduction state. Thereby, the gate node of the drive transistor 22 is in the floating state. Next, at time $t_{13}$, the light emitting control signal DS is in the inactive state, and light emitting control transistor 24 is in the non-conduction state. Thereby, the source node of the drive transistor 22 is in the floating state. That is, after writing the reference voltage $V_{ofs}$ in the gate node of the drive transistor 22, the gate node of the drive transistor 22, and then the source node is in the floating state, in the order thereof.

The gate node of the drive transistor 22 along with the source node are in the floating state, and thereby the self discharge operation is performed. The discharge of the potential of each node in the self discharge operation is performed, through a route of the drive transistor 22→the switching transistor 25→the common power supply line 35. Therefore, by the self discharge operation, the source voltage $V_s$ and the gate voltage $V_g$ of the drive transistor 22 gradually decrease together. In the self discharge operation, basically, the source voltage $V_s$ and the gate voltage $V_g$ of the drive transistor 22 decrease while maintaining the voltage $V_{gs}$ between the gate and the source. At this time, as shown in the timing waveform diagram of FIG. 4, in the case of the drive transistor 22 of which the threshold voltage $V_{th}$ is relatively large (namely, enhancement), and in the case of the drive transistor 22 of which the threshold voltage $V_{th}$ is relatively small (namely, depression), the discharge operations thereof are different.

Due to the self discharge operation, before the writing of the signal voltage $V_{sig}$ with the sampling transistor 23 is performed, the difference between reaching potentials of the source voltage $V_s$ and the gate voltage $V_g$, is generated, depending on the threshold voltage $V_{th}$ and the mobility u of the drive transistor 22. Specifically, as shown in FIG. 4, the difference between the reaching potentials of the source voltage $V_s$ and the gate voltage $V_g$ of the drive transistor 22 of which the threshold voltage $V_{th}$ is relatively large (shown in the broken lines), and the source voltage $V_s$ and the gate voltage $V_g$ of the drive transistor 22 of which the threshold voltage $V_{th}$ is relatively small (shown in the two-dot chain lines), is generated.

The self discharge operation that makes the gate node of the drive transistor 22 along with the source node be in the floating state, is carried out, up to performing the writing of the signal voltage $V_{sig}$ with the sampling transistor 23. Therefore, at time $t_{15}$, the writing scanning signal WS is in the active state, and the sampling transistor 23 is in the conduction state in response thereto. Hereby, the writing of the signal voltage $V_{sig}$ is performed by the sampling with the sampling transistor 23, while making the source node of the drive transistor 22 be in the floating state.

Figure 5A:
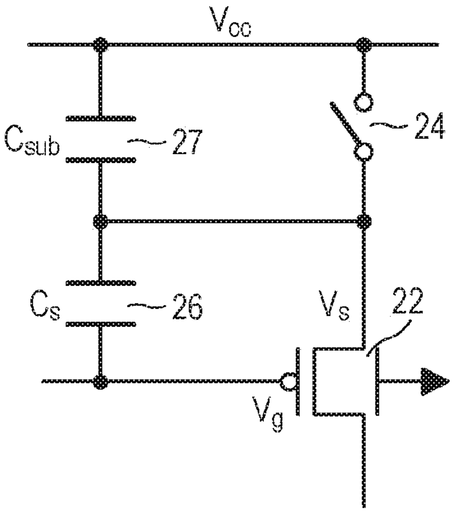
FIG. 5A is a circuit diagram illustrating an equivalent circuit of the pixel when a signal voltage $V_{sig}$ is written.

In FIG. 5A, an equivalent circuit of the pixel (pixel circuit) 20 is shown when the signal voltage $V_{sig}$ is written. In FIG. 5A, for simplification of the drawing, the light emitting control transistor 24 is shown using a symbol of a switch. Furthermore, in FIG. 5B, the situations of the changes in the source voltage $V_s$ and the gate voltage $V_g$ of the drive transistor 22 before and after writing the signal voltage $V_{sig}$, are shown.

Figure 5B:
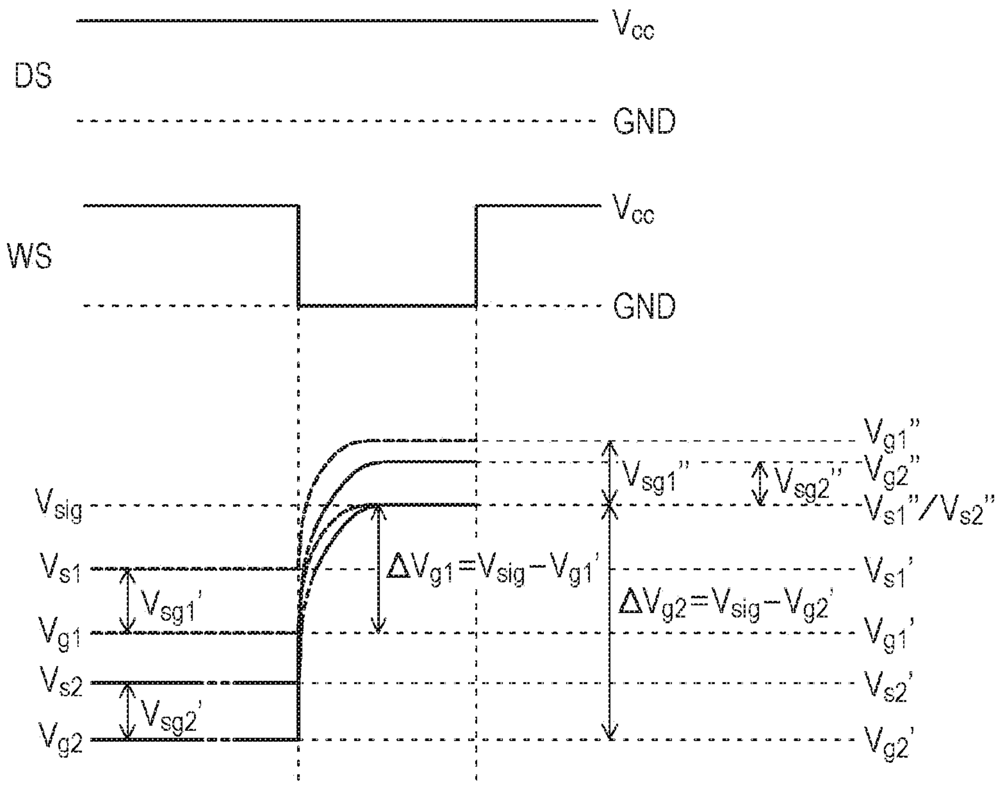
FIG. 5B is a waveform diagram illustrating situations of changes in a source voltage $V_s$ and a gate voltage $V_g$ of a drive transistor before and after writing the signal voltage $V_{sig}$.

In FIG. 5B, the drive transistor 22 of which the threshold voltage $V_{th}$ is relatively large (namely, the enhancement) is represented as a drive transistor 22$_1$, and the drive transistor 22 of which the threshold voltage $V_{th}$ is relatively small (namely, the depression) is represented as a drive transistor 22$_2$. Therefore, the source voltage $V_s$ and the gate voltage $V_g$ of the drive transistor 22$_1$ which is enhanced, are indicated as a $V_{s1}$ and a $V_{g1}$, and the voltage $V_{gs}$ between the gate and the source thereof is indicated as a $V_{gs1}'$. In addition, the gate voltages $V_g$ before and after writing the signal voltage $V_{sig}$, are indicated as a $V_{g1}'$ and a $V_{g1}''$, and the source voltages $V_s$ before and after writing the signal voltage $V_{sig}$, are indicated as a $V_{s1}'$ and a $V_{s1}''$. Similarly, the source voltage $V_s$ and the gate voltage $V_g$ of the drive transistor 22$_2$ which is depressed, are indicated as a $V_{s2}$ and a $V_{g2}$, and the voltage $V_{gs}$ between the gate and the source thereof is indicated as a $V_{gs2}'$. In addition, the gate voltages $V_g$ before and after writing the signal voltage $V_{sig}$, are indicated as a $V_{g2}'$ and a $V_{g2}''$, and the source voltages $V_s$ before and after writing the signal voltage $V_{sig}$, are indicated as a $V_{s2}'$ and a $V_{s2}''$.

After the self discharge operation, the writing of the signal voltage $V_{sig}$ is performed, while making the source node of the drive transistor 22 be in the floating state. Thereby, the change amount $\Delta V_g$ in the gate voltages $V_g$ of the drive transistor 22 before and after writing the signal voltage $V_{sig}$, becomes $V_{sig}-V_g$ ($V_{g1}'$, $V_{g2}'$). Here, if the change amount $\Delta V_g$ of the drive transistor 22$_1$ which is enhanced is a $\Delta V_{g1}$, and the change amount $\Delta V_g$ of the drive transistor 22$_2$ which is depressed is a $\Delta V_{g2}$, the resultant situation becomes $\Delta V_{g2}>\Delta V_{g1}$. Therefore, the source voltage $V_s$ of the drive transistor 22 is determined, by a capacity coupling with the storage capacitor 26 and the sub-storage capacitor 27 at the time of changing the gate voltage $V_g$ of the drive transistor 22, and the source voltage $V_s$ thereof becomes a $V_{s1}''$ and a $V_{s2}''$.

Here, if a capacity value of the storage capacitor 26 is a $C_s$, and the capacity value of the sub-storage capacitor 27 is a $C_{sub}$, the source voltage $V_s''$ ($V_{s1}''$, $V_{s2}''$) of the drive transistor 22 after writing the signal voltage $V_{sig}$ of the video signal, is given by the following expression (1).

$$\begin{aligned} V_s'' &= V_s' + \{C_s/(C_s+C_{sub})\}\Delta V_g \\ &= V_s' + \{C_s/(C_s+C_{sub})\}(V_{sig}-V_g') \end{aligned} \tag{1}$$

Furthermore, the voltage $V_{gs}''$ between the gate and the source of the drive transistor 22 after writing the signal voltage $V_{sig}$ of the video signal, is given by the following expression (2).

$$\begin{aligned} V_{gs}'' &= V_s'' - V_g'' = V_s'' - V_{sig} \\ &= V_s' - \{(C_{sub}V_{sig} + C_sV_g')/(C_s+C_{sub})\} \\ &= V_{gs}' - \{C_{sub}(V_{sig}-V_g')/(C_s+C_{sub})\} \\ &= V_{gs}' - \{C_{sub}/(C_s+C_{sub})\}\Delta V_g \end{aligned} \tag{2}$$

Here, it is assumed that the voltage $V_{gs}'$ between the gate and the source of the drive transistor 22$_1$ which is enhanced before writing the signal voltage $V_{sig}$, is the same ($V_{gs1}'=V_{gs2}'$) as the voltage $V_{gs}'$ between the gate and the source of the drive transistor 22$_2$ which is depressed before writing the signal voltage $V_{sig}$. Then, in comparison with the pixel which is enhanced, in the pixel which is depressed, the change amount $\Delta V_g$ in the gate voltages $V_g$ of the drive transistor 22 before and after writing the signal voltage $V_{sig}$, is large. Accordingly, the voltages $V_{gs}''$ between the gate and the source of the drive transistor 22 before and after writing the signal voltage $V_{sig}$, become narrow.

At time $t_{16}$, the writing operation of the signal voltage $V_{sig}$ is completed. Thereafter, at time $t_{17}$, the light emitting control signal DS is in the active state, and the light emitting control transistor 24 is in the conduction state in response thereto. Hereby, the source voltage $V_s$ of the drive transistor 22 is in the state of being fixed to the power supply voltage $V_{cc}$ (non-floating state). At this time, the gate voltage $V_g$ of the drive transistor 22 increases, by the bootstrap operation. The voltage $V_{gs}''$ between the gate and the source after writing the signal voltage $V_{sig}$, becomes $|V_{gs1}''|>|V_{gs2}''|$.

Therefore, the difference between the voltages $V_{gs}''$ between the gate and the source of the drive transistor 22, which is generated by the variations in the transistor characteristics (threshold voltage $V_{th}$ and mobility u) after writing the signal voltage $V_{sig}$, is stored, and the correction operations are realized. Consequently, in each of the pixels 20, in the state of correcting the variations in the characteristics (threshold voltage $V_{th}$ and mobility u) of the drive transistor 22, the constant drive current (light emitting current) $I_{ds}$ flows through the organic EL element 21, based on the voltage $V_{gs}$ between the gate and the source of the drive transistor 22.

Operation and Effect of the Embodiments

As described above, in the embodiments according to the present disclosure, the features thereof are as follows. When the source node of the drive transistor 22 is in the non-floating state, the reference voltage $V_{ofs}$ for the correction operation is written in the gate node. Thereafter, the self discharge operation that makes the gate node and the source node of the drive transistor 22 be in the floating state, is performed, up to performing the writing of the signal voltage $V_{sig}$ with the sampling transistor 23.

Behavior of the potential of each node at the time of the self discharge operation, in the case of enhancing the drive transistor $22_1$, and in the case of depressing the drive transistor $22_2$, are different. Therefore, before the writing of the signal voltage $V_{sig}$ is performed, the difference between the reaching potentials of the source voltage $V_s$ and the gate voltage $V_g$, is generated, depending on the characteristics (threshold voltage $V_{th}$ and mobility u) of the drive transistor 22. After the self discharge operation, the writing of the signal voltage $V_{sig}$ is performed while making the source node of the drive transistor 22 be in the floating state. Thereby, the source voltage $V_s$ of the drive transistor 22 is determined, by the capacity coupling with the storage capacitor 26 and the sub-storage capacitor 27.

By the operations described above, in each of the pixels 20, in the state of correcting the variations in the characteristics (threshold voltage $V_{th}$ and mobility u) of the drive transistor 22, the constant light emitting current $I_{ds}$ is obtained, based on the voltage $V_{gs}$ between the gate and the source of the drive transistor 22. That is, the self discharge operation that makes the gate node and the source node of the drive transistor 22 be in the floating state, is performed, and thereby it is possible to correct the variations in the characteristics of the drive transistor 22. Accordingly, it is possible to suppress a deterioration of the uniformity which is caused by the variations in the threshold voltage $V_{th}$ and the mobility u of the drive transistor 22, and thus, it is possible to realize a uniform image display. Moreover, by the operations with the switching transistor 25, it is possible to suppress the light emitting of the organic EL element 21 for the non-light emitting period, and thus, it is possible to achieve the high contrast of the display panel 80.

Furthermore, by the correction operations of the characteristics of the drive transistor 22 using the self discharge operation, it is possible to shorten the writing time ($t_{11}$ to $t_{12}$) of the reference voltage $V_{ofs}$ which is the initialization voltage for the correction operation, in comparison with the case of using no self discharge operation. Hereby, the period which is from a writing finish timing (time $t_{12}$) of the reference voltage $V_{ofs}$ to the writing timing (time $t_{15}$) of the signal voltage $V_{sig}$ of the video signal, can be set long, and thus, it is possible to secure the sufficient time for the start-up of the signal voltage $V_{sig}$. Accordingly, after the video signal reaches the desired level, the writing of the signal voltage $V_{sig}$ can be performed, and thus, it is possible to obtain the luminance corresponding to the desired level of the video signal.

Moreover, in comparison with the correction operation of the case of using no self discharge operation, since the correction is performed at the operation point that does not finish dropping the source voltage $V_s$ of the drive transistor 22, the difference between the potentials of the back gate voltage $V_b$ and the source voltage $V_s$ of the drive transistor 22 does not open very much, and an influence of the substrate bias effect is small. Therefore, after the self discharge operation, the writing of the signal voltage $V_{sig}$ is performed, while making the source node of the drive transistor 22 in the floating state, and thereby the difference between the actual effect $V_{th}$ which is obtained before writing the signal voltage $V_{sig}$ and the actual effect $V_{th}$ which is obtained at the light emitting time, is not generated. Accordingly, even when the pixel 20 is formed on the semiconductor (semiconductor substrate), the correction operations of the characteristics (threshold voltage $V_{th}$ and mobility u) of the drive transistor 22, can be performed, while removing a decline of the substrate bias effect. In other words, it is possible to prevent the deterioration of the uniformity due to the influence of the substrate bias effect.

Modification Example

The techniques of the present disclosure are not limited to the embodiments described above, and can be variously modified and altered within the range without departing from the gist of the present disclosure. For example, in the embodiments described above, the case that the techniques of the present disclosure is applied to the display device that is made by forming the transistor to configure the pixel 20 on the semiconductor such as the silicon, is described as an example. However, the techniques of the present disclosure can be also applied with respect to the display device that is made by forming the transistor to configure the pixel 20 on the insulator such as the glass substrate.

Electronic Apparatus

In the electronic apparatuses of all fields that display the video signal which is input to the electronic apparatus, or the video signal which is generated within the electronic apparatus, as an image or a video, the display device according to the embodiment of the present disclosure described above, can be used as the display unit (display device) thereof.

As apparent from the description of the embodiments described above, the display device according to the embodiment of the present disclosure, can secure the sufficient time for the start-up of the video signal, by performing the writing of the initialization voltage for the correction operations of the characteristics in a short time. Therefore, it is possible to obtain the luminance corresponding to the desired level of the video signal. Accordingly, in the electronic apparatuses of all fields, the display device according to the embodiment of the present disclosure, is used as the display unit thereof, and thereby it is possible to obtain the image which is clearly displayed.

As the electronic apparatuses that uses the display device according to the embodiment of the present disclosure to the display unit, in addition to the television system, the head mounted display, the digital camera, the video camera, the game machine, the notebook type personal computer, or the like, may be used as an example.

Furthermore, in the electronic apparatuses of the portable information apparatus such as the electronic book apparatus and an electronic wristwatch, and the portable communication apparatus such as the cellular phone and the PDA, the display device according to the embodiment of the present disclosure can be used as the display unit thereof.

Furthermore, the present disclosure can adopt the following configurations.

(1) A display device including: a pixel array unit that is made by arranging a drive transistor to drive a light emitting unit, a sampling transistor to sample a signal voltage, and a pixel circuit having a storage capacitor to store the signal voltage which is written by sampling with the sampling transistor; and a drive unit that makes a gate node and a source node of the drive transistor be in a floating state up to performing writing of the signal voltage with the sampling transistor, after writing an initialization voltage in the gate node when the source node of the drive transistor is in a non-floating state.

(2) The display device according to the above (1), in which the drive unit makes the source node of the drive transistor be in the floating state, after making the gate node of the drive transistor be in the floating state.

(3) The display device according to the above (1) or (2), in which the drive unit performs the writing of the signal voltage with the sampling transistor, while making the source node of the drive transistor be in the floating state.

(4) The display device according to any one of the above (1) to (3), in which the initialization voltage is supplied to a signal line at a timing different from the signal voltage, and is written in the gate node of the drive transistor by the sampling with the sampling transistor from the signal line.

(5) The display device according to any one of the above (1) to (4), in which the pixel circuit is formed on a semiconductor.

(6) The display device according to the above (5), in which the drive transistor is made up of a P-channel type transistor.

(7) The display device according to the above (5) or (6), in which the sampling transistor is made up of the P-channel type transistor.

(8) The display device according to any one of the above (5) to (7), in which the pixel circuit has a light emitting control transistor that controls light emitting/non-light emitting of the light emitting unit.

(9) The display device according the above (8), in which the light emitting control transistor is made up of the P-channel type transistor.

(10) The display device according to any one of the above (5) to (9), in which the storage capacitor is connected between the gate node and the source node of the drive transistor, and the pixel circuit has a sub-storage capacitor that is connected between the source node of the drive transistor and a node of a fixed potential.

(11) The display device according to any one of the above (5) to (10), in which the pixel circuit has a switching transistor that is connected between a drain node of the drive transistor and a current discharge destination node, and the drive unit makes the switching transistor be in a conduction state for a non-light emitting period of the light emitting unit.

(12) The display device according to the above (11), in which the switching transistor is made up of the P-channel type transistor.

(13) The display device according to the above (11) or (12), in which the drive unit makes a signal to drive the switching transistor be in an active state before a sampling timing of the initialization voltage with the sampling transistor, and makes the signal to drive the switching transistor be in an inactive state after making the signal to drive the light emitting control transistor be in the active state.

(14) The display device according to the above (13), in which the drive unit completes the sampling of the initialization voltage with the sampling transistor, before making the signal to drive the light emitting control transistor be in the inactive state.

(15) A method for driving a display device including a pixel array unit that is made by arranging a drive transistor to drive a light emitting unit, a sampling transistor to sample a signal voltage, and a pixel circuit having a storage capacitor to store the signal voltage which is written by sampling with the sampling transistor; the method including making a gate node and a source node of the drive transistor be in a floating state up to performing writing of the signal voltage with the sampling transistor, after writing an initialization voltage in the gate node when the source node of the drive transistor is in a non-floating state.

(16) An electronic apparatus including: a display device including a pixel array unit that is made by arranging a drive transistor to drive a light emitting unit, a sampling transistor to sample a signal voltage, and a pixel circuit having a storage capacitor to store the signal voltage which is written by sampling with the sampling transistor; and a drive unit that makes a gate node and a source node of the drive transistor be in a floating state up to performing writing of the signal voltage with the sampling transistor, after writing an initialization voltage in the gate node when the source node of the drive transistor is in a non-floating state.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel array unit including a plurality of pixel circuits, at least one pixel circuit of the plurality of pixel circuits includes a drive transistor configured to drive a light emitting unit, a sampling transistor configured to sample an initialization voltage or a signal voltage, and a storage capacitor configured to store the signal voltage that is written by sampling with the sampling transistor; and a drive unit configured to write the initialization voltage in a gate node of the drive transistor when a source node of the drive transistor is in a non-floating state, and responsive to writing the initialization voltage in the gate node, set the gate node and the source node of the drive transistor in a floating state until the sampling transistor samples the signal voltage.

2. The display device according to claim 1, wherein, to set the gate node and the source node of the drive transistor in the floating state, the drive unit is further configured to set the gate node in the floating state, and responsive to setting the gate node in the floating state, set the source node in the floating state.

3. The display device according to claim 1, wherein the drive unit is further configured to write the signal voltage in the gate node with the sampling transistor while the source node is in the floating state.

4. The display device according to claim 1, wherein the initialization voltage is supplied to a signal line at a timing different from the signal voltage, and wherein, to write the initialization voltage in the gate node of the drive transistor, the drive unit is further configured to control the sampling transistor to sample the initialization voltage from the signal line.

5. The display device according to claim 1, wherein the at least one pixel circuit is formed on a semiconductor.

6. The display device according to claim 1, wherein the drive transistor and the sampling transistor are each a P-channel type transistor.

7. The display device according to claim 1, wherein the storage capacitor is connected between the gate node and the source node of the drive transistor, and wherein the at least one pixel circuit has a sub-storage capacitor that is connected between the source node of the drive transistor and a node of a fixed potential.

8. The display device according to claim 1, wherein the at least one pixel circuit further includes a light emitting control transistor that controls emission of the light emitting unit, wherein, to set the source node of the drive transistor in the floating state, the drive unit is further configured to control the light emitting control transistor to be in a non-conduction state, and wherein, to set the gate node of the drive transistor in the floating state, the drive unit is further configured to control the sampling transistor to be in a non-conduction state.

9. The display device according to claim 8, wherein the light emitting control transistor is a P-channel type transistor.

10. The display device according to claim 1, wherein the at least one pixel circuit further includes a switching transistor that is connected between a drain node of the drive transistor and a current discharge destination node, and wherein the drive unit is further configured to control the switching transistor to be in a conduction state during a non-light emitting period of the light emitting unit.

11. The display device according to claim 10, wherein the switching transistor is a P-channel type transistor.

12. The display device according to claim 10, wherein the drive unit is further configured to drive the switching transistor to be in the conduction state before a sampling timing of the initialization voltage with the sampling transistor, and drive the switching transistor be in a non-conduction state during a light emitting period of the light emitting unit.

13. The display device according to claim 12, wherein the drive unit is further configured to complete the sampling of the initialization voltage with the sampling transistor before driving the switching transistor to be in the non-conduction state.

14. A method for driving a display device, the method comprising:

writing, with a sampling transistor, an initialization voltage in a gate node of a drive transistor when a source node of the drive transistor is in a non-floating state, wherein the drive transistor is configured to drive a light emitting unit; and responsive to writing the initialization voltage in the gate node when the source node is in the non-floating state, setting, with a drive unit, the gate node and the source node of the drive transistor to be in a floating state until the sampling transistor samples a signal voltage.

15. The method for driving the display device according to claim 14, further comprising:

setting, with the drive unit, the gate node in the non-floating state; and writing, with the sampling transistor, the signal voltage in the gate node of the drive transistor.

16. The method for driving the display device according to claim 14, setting the gate node and the source node of the drive transistor in the floating state further includes setting the gate node in the floating state, and responsive to setting the gate node in the floating state, setting the source node in the floating state.

17. An electronic apparatus comprising:

a display device including a pixel array unit including a plurality of pixel circuits, at least one pixel circuit of the plurality of pixel circuits includes a drive transistor configured to drive a light emitting unit, a sampling transistor configured to sample an initialization voltage or a signal voltage, and a storage capacitor configured to store the signal voltage that is written by sampling with the sampling transistor; and a drive unit configured to write the initialization voltage in a gate node of the drive transistor when a source node of the drive transistor is in a non-floating state, and responsive to writing the initialization voltage in the gate node, set the gate node and the source node of the drive transistor in a floating state until the sampling transistor samples the signal voltage.

18. The electronic apparatus according to claim 17, wherein the drive unit is further configured to write the signal voltage in the gate node with the sampling transistor while the source node is in the floating state.

19. The electronic apparatus according to claim 17, wherein the at least one pixel circuit further includes a switching transistor that is connected between a drain node of the drive transistor and a current discharge destination node, and wherein the drive unit is further configured to control the switching transistor to be in a conduction state during a non-light emitting period of the light emitting unit.

20. The electronic apparatus according to claim 17, wherein the at least one pixel circuit further includes a light emitting control transistor that controls emission of the light emitting unit, wherein, to set the source node of the drive transistor in the floating state, the drive unit is further configured to control the light emitting control transistor to be in a non-conduction state, and wherein, to set the gate node of the drive transistor in the floating state, the drive unit is further configured to control the sampling transistor to be in a non-conduction state.

* * * * *